US011736436B2

(12) United States Patent
Nigam et al.

(10) Patent No.: US 11,736,436 B2
(45) Date of Patent: Aug. 22, 2023

(54) IDENTIFYING ROUTES WITH INDIRECT ADDRESSING IN A DATACENTER

(71) Applicant: VMware, Inc., Palo Alto, CA (US)

(72) Inventors: Avinash Nigam, Pune (IN); Devraj N. Baheti, Akola (IN); Amol Manohar Vaikar, Pune (IN)

(73) Assignee: VMWARE, INC., Palo Alto, CA (US)

( * ) Notice: Subject to any disclaimer, the term of this patent is extended or adjusted under 35 U.S.C. 154(b) by 167 days.

(21) Appl. No.: 17/185,824

(22) Filed: Feb. 25, 2021

(65) Prior Publication Data

US 2022/0210120 A1 Jun. 30, 2022

(30) Foreign Application Priority Data

Dec. 31, 2020 (IN) .............................. 202041057383

(51) Int. Cl.
    *G06F 15/16* (2006.01)
    *G06F 9/54* (2006.01)
    *H04L 29/06* (2006.01)
    *H04L 61/2557* (2022.01)
    *H04L 61/2517* (2022.01)
    *H04L 61/256* (2022.01)
    *H04L 45/741* (2022.01)

(52) U.S. Cl.
    CPC ........ *H04L 61/2557* (2013.01); *H04L 61/256* (2013.01); *H04L 61/2517* (2013.01); *H04L 45/741* (2013.01)

(58) Field of Classification Search
    CPC ............. H04L 61/2557; H04L 61/2517; H04L 61/256; H04L 45/741

USPC ......................................................... 709/245
See application file for complete search history.

(56) References Cited

U.S. PATENT DOCUMENTS 5,224,100 A    6/1993   Lee et al.
5,245,609 A    9/1993   Ofek et al.
(Continued)

FOREIGN PATENT DOCUMENTS

EP          1154601 A1    11/2001
JP      2002141905 A     5/2002
(Continued)

OTHER PUBLICATIONS

Non-Published commonly Owned U.S. Appl. No. 17/006,845, filed Aug. 30, 2020, 70 pages, VMware, Inc.
(Continued)

*Primary Examiner* — Hamza N Algibhah
(74) *Attorney, Agent, or Firm* — Adeli LLP

(57) ABSTRACT

Some embodiments provide a novel method of tracking connections in a network. The method receives an identification of a first network endpoint and a second network endpoint. The method then determines that the first network endpoint cannot directly address a packet flow to the second network endpoint. The method identifies an address translation rule of a network device that translates an address of the second network endpoint into a translated address. The method then determines that the first network endpoint can directly address a packet flow to the translated address. The method then identifies a route from the first network endpoint to the second endpoint through the network device that translates the address and displays the route including an identifier of the network device.

20 Claims, 10 Drawing Sheets

(56) References Cited

U.S. PATENT DOCUMENTS

| | | |
|---|---|---|
| 5,265,092 A | 11/1993 | Soloway et al. |
| 5,504,921 A | 4/1996 | Dev et al. |
| 5,550,816 A | 8/1996 | Hardwick et al. |
| 5,729,685 A | 3/1998 | Chatwani et al. |
| 5,751,967 A | 5/1998 | Raab et al. |
| 5,781,534 A | 7/1998 | Perlman et al. |
| 5,805,819 A | 9/1998 | Chin et al. |
| 6,104,699 A | 8/2000 | Holender et al. |
| 6,104,700 A | 8/2000 | Haddock et al. |
| 6,141,738 A | 10/2000 | Munter et al. |
| 6,219,699 B1 | 4/2001 | McCloghrie et al. |
| 6,430,160 B1 | 8/2002 | Smith et al. |
| 6,456,624 B1 | 9/2002 | Eccles et al. |
| 6,512,745 B1 | 1/2003 | Abe et al. |
| 6,539,432 B1 | 3/2003 | Taguchi et al. |
| 6,658,002 B1 | 12/2003 | Ross et al. |
| 6,680,934 B1 | 1/2004 | Cain |
| 6,721,334 B1 | 4/2004 | Ketcham |
| 6,785,843 B1 | 8/2004 | McRae et al. |
| 6,882,642 B1 | 4/2005 | Kejriwal et al. |
| 6,941,487 B1 | 9/2005 | Balakrishnan et al. |
| 6,963,585 B1 | 11/2005 | Pennec et al. |
| 6,999,454 B1 | 2/2006 | Crump |
| 7,013,342 B2 | 3/2006 | Riddle |
| 7,062,559 B2 | 6/2006 | Yoshimura et al. |
| 7,079,544 B2 | 7/2006 | Wakayama et al. |
| 7,180,856 B1 | 2/2007 | Breslau et al. |
| 7,197,572 B2 | 3/2007 | Matters et al. |
| 7,200,144 B2 | 4/2007 | Terrell et al. |
| 7,209,439 B2 | 4/2007 | Rawlins et al. |
| 7,243,143 B1 | 7/2007 | Bullard |
| 7,283,473 B2 | 10/2007 | Arndt et al. |
| 7,315,985 B1 | 1/2008 | Gauvin et al. |
| 7,342,916 B2 | 3/2008 | Das et al. |
| 7,391,771 B2 | 6/2008 | Orava et al. |
| 7,450,598 B2 | 11/2008 | Chen et al. |
| 7,457,870 B1 | 11/2008 | Lownsbrough et al. |
| 7,463,579 B2 | 12/2008 | Lapuh et al. |
| 7,478,173 B1 | 1/2009 | Delco |
| 7,483,370 B1 | 1/2009 | Dayal et al. |
| 7,555,002 B2 | 6/2009 | Arndt et al. |
| 7,577,131 B2 | 8/2009 | Joseph et al. |
| 7,590,133 B2 | 9/2009 | Hatae et al. |
| 7,602,723 B2 | 10/2009 | Mandato et al. |
| 7,606,260 B2 | 10/2009 | Oguchi et al. |
| 7,627,692 B2 | 12/2009 | Pessi |
| 7,633,955 B1 | 12/2009 | Saraiya et al. |
| 7,639,625 B2 | 12/2009 | Kaminsky et al. |
| 7,643,488 B2 | 1/2010 | Khanna et al. |
| 7,649,851 B2 | 1/2010 | Takashige et al. |
| 7,706,266 B2 | 4/2010 | Plamondon |
| 7,710,874 B2 | 5/2010 | Balakrishnan et al. |
| 7,729,245 B1 | 6/2010 | Breslau et al. |
| 7,760,735 B1 | 7/2010 | Chen et al. |
| 7,764,599 B2 | 7/2010 | Doi et al. |
| 7,792,987 B1 | 9/2010 | Vohra et al. |
| 7,802,000 B1 | 9/2010 | Huang et al. |
| 7,808,919 B2 | 10/2010 | Nadeau et al. |
| 7,808,929 B2 | 10/2010 | Wong et al. |
| 7,818,452 B2 | 10/2010 | Matthews et al. |
| 7,826,482 B1 | 11/2010 | Minei et al. |
| 7,839,847 B2 | 11/2010 | Nadeau et al. |
| 7,885,276 B1 | 2/2011 | Lin |
| 7,936,770 B1 | 5/2011 | Frattura et al. |
| 7,937,438 B1 | 5/2011 | Miller et al. |
| 7,937,492 B1 | 5/2011 | Kompella et al. |
| 7,948,986 B1 | 5/2011 | Ghosh et al. |
| 7,953,865 B1 | 5/2011 | Miller et al. |
| 7,991,859 B1 | 8/2011 | Miller et al. |
| 7,995,483 B1 | 8/2011 | Bayar et al. |
| 8,018,943 B1 | 9/2011 | Pleshek et al. |
| 8,024,478 B2 | 9/2011 | Patel |
| 8,027,354 B1 | 9/2011 | Portolani et al. |
| 8,031,606 B2 | 10/2011 | Memon et al. |
| 8,031,633 B2 | 10/2011 | Bueno et al. |
| 8,046,456 B1 | 10/2011 | Miller et al. |
| 8,054,832 B1 | 11/2011 | Shukla et al. |
| 8,055,789 B2 | 11/2011 | Richardson et al. |
| 8,060,875 B1 | 11/2011 | Lambeth |
| 8,131,852 B1 | 3/2012 | Miller et al. |
| 8,149,737 B2 | 4/2012 | Metke et al. |
| 8,155,028 B2 | 4/2012 | Abu-Hamdeh et al. |
| 8,161,270 B1 | 4/2012 | Parker et al. |
| 8,166,201 B2 | 4/2012 | Richardson et al. |
| 8,199,750 B1 | 6/2012 | Schultz et al. |
| 8,223,668 B2 | 7/2012 | Allan et al. |
| 8,224,931 B1 | 7/2012 | Brandwine et al. |
| 8,224,971 B1 | 7/2012 | Miller et al. |
| 8,254,273 B2 | 8/2012 | Kaminsky et al. |
| 8,265,062 B2 | 9/2012 | Tang et al. |
| 8,265,075 B2 | 9/2012 | Pandey |
| 8,281,067 B2 | 10/2012 | Stolowitz |
| 8,290,137 B2 | 10/2012 | Yurchenko et al. |
| 8,306,043 B2 | 11/2012 | Breslau et al. |
| 8,312,129 B1 | 11/2012 | Miller et al. |
| 8,339,959 B1 | 12/2012 | Moisand et al. |
| 8,339,994 B2 | 12/2012 | Gnanasekaran et al. |
| 8,345,558 B2 | 1/2013 | Nicholson et al. |
| 8,351,418 B2 | 1/2013 | Zhao et al. |
| 8,359,576 B2 | 1/2013 | Prasad et al. |
| 8,456,984 B2 | 6/2013 | Ranganathan et al. |
| 8,504,718 B2 | 8/2013 | Wang et al. |
| 8,565,108 B1 | 10/2013 | Marshall et al. |
| 8,571,031 B2 | 10/2013 | Davies et al. |
| 8,611,351 B2 | 12/2013 | Gooch et al. |
| 8,612,627 B1 | 12/2013 | Brandwine |
| 8,625,594 B2 | 1/2014 | Safrai et al. |
| 8,625,603 B1 | 1/2014 | Ramakrishnan et al. |
| 8,625,616 B2 | 1/2014 | Vobbilisetty et al. |
| 8,644,188 B1 | 2/2014 | Brandwine et al. |
| 8,645,952 B2 | 2/2014 | Biswas et al. |
| 8,750,288 B2 | 6/2014 | Nakil et al. |
| 8,762,501 B2 | 6/2014 | Kempf et al. |
| 8,806,005 B2 | 8/2014 | Miri et al. |
| 8,837,300 B2 | 9/2014 | Nedeltchev et al. |
| 8,838,743 B2 | 9/2014 | Lewites et al. |
| 8,929,221 B2 | 1/2015 | Breslau et al. |
| 8,934,495 B1 | 1/2015 | Hilton et al. |
| 9,059,926 B2 | 6/2015 | Akhter et al. |
| 9,197,529 B2 | 11/2015 | Ganichev et al. |
| 9,226,220 B2 | 12/2015 | Banks et al. |
| 9,258,195 B1 | 2/2016 | Pendleton et al. |
| 9,280,448 B2 | 3/2016 | Farrell et al. |
| 9,282,019 B2 | 3/2016 | Ganichev et al. |
| 9,344,349 B2 | 5/2016 | Ganichev et al. |
| 9,407,580 B2 | 8/2016 | Ganichev et al. |
| 9,602,334 B2 | 3/2017 | Benny |
| 9,729,433 B2 | 8/2017 | Polland |
| 9,860,151 B2 | 1/2018 | Ganichev et al. |
| 9,898,317 B2 | 2/2018 | Nakil et al. |
| 10,044,581 B1 | 8/2018 | Russell |
| 10,181,993 B2 | 1/2019 | Ganichev et al. |
| 10,200,306 B2 | 2/2019 | Nhu et al. |
| 10,469,342 B2 | 11/2019 | Lenglet et al. |
| 10,608,887 B2 | 3/2020 | Jain et al. |
| 10,728,121 B1 | 7/2020 | Chitalia et al. |
| 10,778,557 B2 | 9/2020 | Ganichev et al. |
| 10,805,239 B2 | 10/2020 | Nhu et al. |
| 11,128,550 B2 | 9/2021 | Lenglet et al. |
| 11,196,628 B1 | 12/2021 | Shen et al. |
| 11,201,808 B2 | 12/2021 | Ganichev et al. |
| 11,336,533 B1 | 5/2022 | Bogado et al. |
| 11,336,590 B2 | 5/2022 | Nhu et al. |
| 11,558,426 B2 | 1/2023 | Shen et al. |
| 11,570,090 B2 | 1/2023 | Shen et al. |
| 2001/0020266 A1 | 9/2001 | Kojima et al. |
| 2001/0043614 A1 | 11/2001 | Viswanadham et al. |
| 2002/0093952 A1 | 7/2002 | Gonda |
| 2002/0178356 A1* | 11/2002 | Mattila ............... H04L 9/3263 713/156 |
| 2002/0194369 A1 | 12/2002 | Rawlins et al. |
| 2003/0041170 A1 | 2/2003 | Suzuki |
| 2003/0058850 A1 | 3/2003 | Rangarajan et al. |

(56) References Cited

U.S. PATENT DOCUMENTS

| | | |
|---|---|---|
| 2004/0024879 A1* | 2/2004 | Dingman .............. H04L 63/029 709/227 |
| 2004/0073659 A1 | 4/2004 | Rajsic et al. |
| 2004/0098505 A1 | 5/2004 | Clemmensen |
| 2004/0186914 A1 | 9/2004 | Shimada |
| 2004/0267866 A1 | 12/2004 | Carollo et al. |
| 2004/0267897 A1 | 12/2004 | Hill et al. |
| 2005/0018669 A1 | 1/2005 | Arndt et al. |
| 2005/0027881 A1 | 2/2005 | Figueira et al. |
| 2005/0053079 A1 | 3/2005 | Havala |
| 2005/0083953 A1 | 4/2005 | May |
| 2005/0105524 A1* | 5/2005 | Stevens ................... H04L 45/20 370/352 |
| 2005/0111445 A1 | 5/2005 | Wybenga et al. |
| 2005/0120160 A1 | 6/2005 | Plouffe et al. |
| 2005/0132044 A1 | 6/2005 | Guingo et al. |
| 2005/0149604 A1 | 7/2005 | Navada |
| 2005/0182853 A1 | 8/2005 | Lewites et al. |
| 2005/0220030 A1 | 10/2005 | Nagami et al. |
| 2005/0220096 A1 | 10/2005 | Friskney et al. |
| 2005/0232230 A1 | 10/2005 | Nagami et al. |
| 2006/0002370 A1 | 1/2006 | Rabie et al. |
| 2006/0026225 A1 | 2/2006 | Canali et al. |
| 2006/0028999 A1 | 2/2006 | Iakobashvili et al. |
| 2006/0029056 A1 | 2/2006 | Perera et al. |
| 2006/0037075 A1 | 2/2006 | Frattura et al. |
| 2006/0174087 A1 | 8/2006 | Hashimoto et al. |
| 2006/0187908 A1 | 8/2006 | Shimozono et al. |
| 2006/0193266 A1 | 8/2006 | Siddha et al. |
| 2006/0206655 A1 | 9/2006 | Chappell et al. |
| 2006/0218447 A1 | 9/2006 | Garcia et al. |
| 2006/0221961 A1 | 10/2006 | Basso et al. |
| 2006/0282895 A1 | 12/2006 | Rentzis et al. |
| 2006/0291388 A1 | 12/2006 | Amdahl et al. |
| 2007/0050763 A1 | 3/2007 | Kagan et al. |
| 2007/0055789 A1 | 3/2007 | Claise et al. |
| 2007/0064673 A1 | 3/2007 | Bhandaru et al. |
| 2007/0097982 A1 | 5/2007 | Wen et al. |
| 2007/0156919 A1 | 7/2007 | Potti et al. |
| 2007/0260721 A1 | 11/2007 | Bose et al. |
| 2007/0286185 A1 | 12/2007 | Eriksson et al. |
| 2007/0297428 A1 | 12/2007 | Bose et al. |
| 2008/0002579 A1 | 1/2008 | Lindholm et al. |
| 2008/0002683 A1 | 1/2008 | Droux et al. |
| 2008/0021925 A1 | 1/2008 | Sweeney |
| 2008/0049614 A1 | 2/2008 | Briscoe et al. |
| 2008/0049621 A1 | 2/2008 | McGuire et al. |
| 2008/0049752 A1* | 2/2008 | Grant ...................... H04L 45/38 370/392 |
| 2008/0049786 A1 | 2/2008 | Ram et al. |
| 2008/0059556 A1 | 3/2008 | Greenspan et al. |
| 2008/0071900 A1 | 3/2008 | Hecker et al. |
| 2008/0086726 A1 | 4/2008 | Griffith et al. |
| 2008/0112551 A1 | 5/2008 | Forbes et al. |
| 2008/0159301 A1 | 7/2008 | Heer |
| 2008/0240095 A1 | 10/2008 | Basturk |
| 2009/0010254 A1 | 1/2009 | Shimada |
| 2009/0100298 A1 | 4/2009 | Lange et al. |
| 2009/0109973 A1 | 4/2009 | Ilnicki |
| 2009/0123903 A1 | 5/2009 | Weitenberner |
| 2009/0150527 A1 | 6/2009 | Tripathi et al. |
| 2009/0245138 A1 | 10/2009 | Sapsford et al. |
| 2009/0248895 A1 | 10/2009 | Archer et al. |
| 2009/0249213 A1 | 10/2009 | Murase et al. |
| 2009/0292858 A1 | 11/2009 | Lambeth et al. |
| 2009/0327903 A1 | 12/2009 | Smith et al. |
| 2010/0128623 A1 | 5/2010 | Dunn et al. |
| 2010/0131636 A1 | 5/2010 | Suri et al. |
| 2010/0188976 A1 | 7/2010 | Rahman et al. |
| 2010/0214949 A1 | 8/2010 | Smith et al. |
| 2010/0232435 A1 | 9/2010 | Jabr et al. |
| 2010/0254385 A1 | 10/2010 | Sharma et al. |
| 2010/0275199 A1 | 10/2010 | Smith et al. |
| 2010/0306408 A1 | 12/2010 | Greenberg et al. |
| 2010/0332626 A1* | 12/2010 | Jonsson .................. H04L 61/59 709/238 |
| 2011/0022695 A1 | 1/2011 | Dalal et al. |
| 2011/0055710 A1 | 3/2011 | Kirkby et al. |
| 2011/0075664 A1 | 3/2011 | Lambeth et al. |
| 2011/0085557 A1 | 4/2011 | Gnanasekaran et al. |
| 2011/0085559 A1 | 4/2011 | Chung et al. |
| 2011/0085563 A1 | 4/2011 | Kotha et al. |
| 2011/0128959 A1 | 6/2011 | Bando et al. |
| 2011/0137602 A1 | 6/2011 | Desineni et al. |
| 2011/0194567 A1 | 8/2011 | Shen |
| 2011/0202920 A1 | 8/2011 | Takase |
| 2011/0261825 A1 | 10/2011 | Ichino |
| 2011/0299413 A1 | 12/2011 | Chatwani et al. |
| 2011/0299534 A1 | 12/2011 | Koganti et al. |
| 2011/0299537 A1 | 12/2011 | Saraiya et al. |
| 2011/0305167 A1 | 12/2011 | Koide |
| 2011/0317559 A1 | 12/2011 | Kern et al. |
| 2011/0317696 A1 | 12/2011 | Aldrin et al. |
| 2012/0079478 A1 | 3/2012 | Galles et al. |
| 2012/0151352 A1 | 6/2012 | Ramprasad et al. |
| 2012/0159454 A1 | 6/2012 | Barham et al. |
| 2012/0182992 A1 | 7/2012 | Cowart et al. |
| 2012/0275331 A1 | 11/2012 | Benkö et al. |
| 2012/0287791 A1 | 11/2012 | Xi et al. |
| 2012/0314599 A1 | 12/2012 | Vilke et al. |
| 2013/0010600 A1 | 1/2013 | Jocha et al. |
| 2013/0019008 A1 | 1/2013 | Jorgenson et al. |
| 2013/0024579 A1 | 1/2013 | Zhang et al. |
| 2013/0031233 A1 | 1/2013 | Feng et al. |
| 2013/0041934 A1 | 2/2013 | Annamalaisami et al. |
| 2013/0044636 A1 | 2/2013 | Koponen et al. |
| 2013/0054761 A1 | 2/2013 | Kempf et al. |
| 2013/0058346 A1 | 3/2013 | Sridharan et al. |
| 2013/0067067 A1 | 3/2013 | Miri et al. |
| 2013/0097329 A1* | 4/2013 | Alex .................... H04L 61/2567 709/228 |
| 2013/0125120 A1 | 5/2013 | Zhang et al. |
| 2013/0163427 A1 | 6/2013 | Beliveau et al. |
| 2013/0163475 A1 | 6/2013 | Beliveau et al. |
| 2013/0294249 A1 | 11/2013 | Lin et al. |
| 2013/0332602 A1 | 12/2013 | Nakil et al. |
| 2013/0332983 A1 | 12/2013 | Koorevaar et al. |
| 2013/0339544 A1 | 12/2013 | Mithyantha |
| 2013/0346487 A1* | 12/2013 | Tanimoto ............ H04L 12/4641 709/203 |
| 2014/0019639 A1 | 1/2014 | Ueno |
| 2014/0029451 A1 | 1/2014 | Nguyen |
| 2014/0115578 A1 | 4/2014 | Cooper et al. |
| 2014/0119203 A1 | 5/2014 | Sundaram et al. |
| 2014/0126418 A1 | 5/2014 | Brendel et al. |
| 2014/0157405 A1 | 6/2014 | Joll et al. |
| 2014/0177633 A1 | 6/2014 | Manula et al. |
| 2014/0195666 A1 | 7/2014 | Dumitriu et al. |
| 2014/0207926 A1 | 7/2014 | Benny |
| 2014/0219086 A1 | 8/2014 | Cantu' et al. |
| 2014/0281030 A1 | 9/2014 | Cui et al. |
| 2014/0282823 A1 | 9/2014 | Rash et al. |
| 2014/0297846 A1 | 10/2014 | Hoja et al. |
| 2014/0304393 A1 | 10/2014 | Annamalaisami et al. |
| 2014/0317313 A1* | 10/2014 | Okita .................. H04L 61/2557 709/245 |
| 2014/0351415 A1 | 11/2014 | Harrigan et al. |
| 2015/0016286 A1 | 1/2015 | Ganichev et al. |
| 2015/0016287 A1 | 1/2015 | Ganichev et al. |
| 2015/0016298 A1 | 1/2015 | Ganichev et al. |
| 2015/0016469 A1 | 1/2015 | Ganichev et al. |
| 2015/0043378 A1 | 2/2015 | Bardgett et al. |
| 2015/0180755 A1 | 6/2015 | Zhang et al. |
| 2015/0195169 A1 | 7/2015 | Liu et al. |
| 2015/0263899 A1 | 9/2015 | Tubaltsev et al. |
| 2015/0271011 A1 | 9/2015 | Neginhal et al. |
| 2015/0281036 A1 | 10/2015 | Sun et al. |
| 2016/0105333 A1 | 4/2016 | Lenglet et al. |
| 2016/0119204 A1 | 4/2016 | Murasato et al. |
| 2016/0142291 A1 | 5/2016 | Polland |
| 2016/0149791 A1 | 5/2016 | Ganichev et al. |
| 2016/0226741 A1 | 8/2016 | Ganichev et al. |
| 2016/0274558 A1 | 9/2016 | Strohmenger et al. |

(56) References Cited

U.S. PATENT DOCUMENTS

| | | |
|---|---|---|
| 2016/0359880 A1 | 12/2016 | Pang et al. |
| 2017/0026270 A1 | 1/2017 | Shankar |
| 2017/0222881 A1 | 8/2017 | Holbrook et al. |
| 2017/0288991 A1 | 10/2017 | Ganesh |
| 2017/0317954 A1 | 11/2017 | Masurekar et al. |
| 2017/0358111 A1 | 12/2017 | Madsen |
| 2017/0373950 A1 | 12/2017 | Szilagyi et al. |
| 2018/0041470 A1* | 2/2018 | Schultz ............... H04L 63/0263 |
| 2018/0062939 A1 | 3/2018 | Kulkarni et al. |
| 2018/0063188 A1 | 3/2018 | Karin et al. |
| 2018/0091388 A1 | 3/2018 | Levy et al. |
| 2018/0102959 A1 | 4/2018 | Ganichev et al. |
| 2018/0123903 A1 | 5/2018 | Holla et al. |
| 2018/0136798 A1 | 5/2018 | Aggour et al. |
| 2018/0219751 A1 | 8/2018 | Cavuto et al. |
| 2018/0262447 A1 | 9/2018 | Nhu et al. |
| 2018/0262594 A1 | 9/2018 | Nhu et al. |
| 2018/0309637 A1 | 10/2018 | Gill et al. |
| 2018/0373961 A1 | 12/2018 | Wang et al. |
| 2018/0375728 A1 | 12/2018 | Gangil et al. |
| 2019/0014029 A1 | 1/2019 | Burgio et al. |
| 2019/0109769 A1 | 4/2019 | Jain et al. |
| 2019/0129738 A1* | 5/2019 | Ekbote ................. H04L 41/147 |
| 2019/0140931 A1 | 5/2019 | Ganichev et al. |
| 2019/0158377 A1 | 5/2019 | Chau |
| 2020/0067799 A1 | 2/2020 | Lenglet et al. |
| 2020/0106744 A1 | 4/2020 | Miriyala et al. |
| 2020/0136943 A1 | 4/2020 | Banyai et al. |
| 2020/0169476 A1 | 5/2020 | Vela et al. |
| 2020/0204457 A1 | 6/2020 | Hu et al. |
| 2020/0210195 A1 | 7/2020 | Lampert et al. |
| 2020/0304389 A1 | 9/2020 | Bauan et al. |
| 2020/0313985 A1 | 10/2020 | Jayakumar et al. |
| 2020/0322243 A1 | 10/2020 | Xi et al. |
| 2020/0322249 A1* | 10/2020 | Liu ...................... H04L 41/145 |
| 2020/0336387 A1 | 10/2020 | Suzuki et al. |
| 2021/0014157 A1 | 1/2021 | Zhou |
| 2021/0029059 A1 | 1/2021 | Nhu et al. |
| 2021/0051100 A1 | 2/2021 | Chitalia et al. |
| 2021/0051109 A1 | 2/2021 | Chitalia et al. |
| 2021/0092064 A1 | 3/2021 | Sidebottom et al. |
| 2021/0216908 A1 | 7/2021 | Lu et al. |
| 2021/0218630 A1 | 7/2021 | Lu et al. |
| 2021/0218652 A1 | 7/2021 | Raut et al. |
| 2021/0266259 A1 | 8/2021 | Renner, III et al. |
| 2021/0311764 A1 | 10/2021 | Rosoff et al. |
| 2021/0367927 A1* | 11/2021 | Selvaraj ................ H04L 61/256 |
| 2022/0014451 A1 | 1/2022 | Naik et al. |
| 2022/0021616 A1* | 1/2022 | K ........................... H04L 45/72 |
| 2022/0038368 A1 | 2/2022 | Shen et al. |
| 2022/0038501 A1 | 2/2022 | Shen et al. |
| 2022/0103452 A1 | 3/2022 | Ganichev et al. |
| 2022/0103460 A1* | 3/2022 | Yu ........................... H04L 45/64 |
| 2022/0150136 A1 | 5/2022 | Chen |
| 2022/0165035 A1 | 5/2022 | Cui et al. |
| 2022/0224620 A1 | 7/2022 | Chhabra et al. |
| 2022/0263721 A1 | 8/2022 | Bogado et al. |
| 2023/0006886 A1 | 1/2023 | Parashar et al. |
| 2023/0023956 A1 | 1/2023 | Gajjar et al. |
| 2023/0039791 A1* | 2/2023 | Paladugu ............. H04W 80/10 |

FOREIGN PATENT DOCUMENTS

| | | |
|---|---|---|
| JP | 2003069609 A | 3/2003 |
| JP | 2003124976 A | 4/2003 |
| JP | 2003318949 A | 11/2003 |
| WO | 9506989 A1 | 3/1995 |
| WO | 2012126488 A1 | 9/2012 |
| WO | 2013184846 A1 | 12/2013 |
| WO | 2015005968 A1 | 1/2015 |

OTHER PUBLICATIONS

Non-Published commonly Owned U.S. Appl. No. 17/006,846, filed Aug. 30, 2020, 47 pages, VMware, Inc.

Non-Published commonly Owned U.S. Appl. No. 17/006,847, filed Aug. 30, 2020, 47 pages, VMware, Inc.

Non-Published commonly Owned U.S. Appl. No. 17/185,690, filed Feb. 25, 2021, 38 pages, VMware, Inc.

Phaal, Peter, et al., "sFlow Version 5," Jul. 2004, 46 pages, available at http://www.sflow.org/sflow_version_5.txt.

Phan, Doantam, et al., "Visual Analysis of Network Flow Data with Timelines and Event Plots," VizSEC 2007, Month Unknown 2007, 16 pages.

Non-Published commonly Owned U.S. Appl. No. 17/732,440, filed Apr. 28, 2022, 46 pages, VMware, Inc.

Levin, Anna, et al., "Network Monitoring in Federated Cloud Environment," 2017 IEEE International Conference on Smart Computing, May 29-31, 2017, 6 pages, IEEE, Hong Kong, China.

Non-Published commonly Owned U.S. Appl. No. 18/102,699, filed Jan. 28, 2023, 77 pages, VMware, Inc.

\* cited by examiner

IDENTIFYING ROUTES WITH INDIRECT ADDRESSING IN A DATACENTER

BACKGROUND

Datacenters and other private or public networks with internal addressing schemes often have subnets with separate addressing schemes from the main network and other subnets. In some cases, a particular virtual machine (VM) or other device in the datacenter may not be able to directly address a second particular VM or device of the datacenter. However, the two VMs/devices may be able to connect through indirect addressing through a network device that provides indirect addressing, such as a network address translation (NAT) device or a load balancer that translates virtual internet protocol (VIP) addresses into dynamic IP (DIP) addresses. Such indirect addressing may be desirable for various reasons, such as providing additional security by hiding a group of IP addresses behind a single IP, re-using private IP space, and/or faster deployment of virtual Apps. NAT devices provide indirect addressing that enables private IP networks that use unregistered IP addresses to connect to the Internet or other networks and sub-networks. Load balancers provide indirect addressing that helps to distribute the load of multiple connections across multiple servers. Prior art network mapping systems display direct addressing routes between VMs in datacenters, however, there is a need for an efficient method for determining indirect routes between VMs/devices separated by network devices that provide address translation for indirect routing.

BRIEF SUMMARY

Some embodiments provide a novel method of tracking connections in a network. The method receives an identification of a first network endpoint and a second network endpoint. The method then determines that the first network endpoint cannot directly address a packet flow to the second network endpoint. The method identifies an address translation rule of a network device that translates an address of the second network endpoint into a translated address. The method then determines that the first network endpoint can directly address a packet flow to the translated address. The method then identifies a route (sometimes referred to herein as a "path") from the first network endpoint to the second network endpoint through the network device that translates the address and displays the route including an identifier of the network device.

In some embodiments, the network device is a load balancer or a network address translation (NAT) device. The network device of some embodiments uses the address translation rule, e.g., a destination NAT (DNAT), to change IP addresses of packets sent between the first and second endpoints.

In some embodiments, the network device is one of multiple network devices that each change IP addresses and/or port addresses of packets sent between the first and second endpoints and displaying the route also includes displaying an identifier of each of the multiple network devices.

Displaying the route, in some embodiments, includes displaying an interface option that, when selected, displays at least one address of a packet flow before the packet flow passes through the network device. The displayed addresses may include both an incoming address of a packet flow entering the network device and a translated address of the packet flow leaving the network device.

In some embodiments, the incoming address is an incoming destination address of the packet flow and the translated address is a translated destination address of the packet flow. In some embodiments, the incoming address is an incoming source address of the packet flow and the translated address is a translated source address of the packet flow.

In some embodiments that include an interface option, when the interface option is selected, the method also displays an incoming and outgoing interface identifier for the address translation rule. The display of the incoming address may include a display of both an IP address and a port address. Likewise, the display of the translated address may include a display of an IP address and a port address.

In some embodiments, the method receives a command to us an indirect route before identifying the route. In other embodiments, the method automatically determines that the route passes through the network device and that the address translation rule applies to packets using the route.

In some embodiments, before identifying an address translation rule that produces a translated address that the first endpoint can directly address, the method identifies a second address translation rule that produces a translated address that the first endpoint cannot directly address.

In some embodiments, no address translation rule that applies to the second network endpoint produces a translated address that is directly addressable by the first network endpoint. In such embodiments, the method finds at least one additional translation rule that applies to a translated address produced by the first address translation rule (possibly in addition to subsequent address translation rules) that eventually produce a translated address that the first network endpoint can directly address.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, the Drawings and the Claims is needed. Moreover, the claimed subject matters are not to be limited by the illustrative details in the Summary, Detailed Description and the Drawing.

BRIEF DESCRIPTION OF THE DRAWINGS

The novel features of the invention are set forth in the appended claims. However, for purpose of explanation, several embodiments of the invention are set forth in the following figures.

DETAILED DESCRIPTION

Figure 1A:
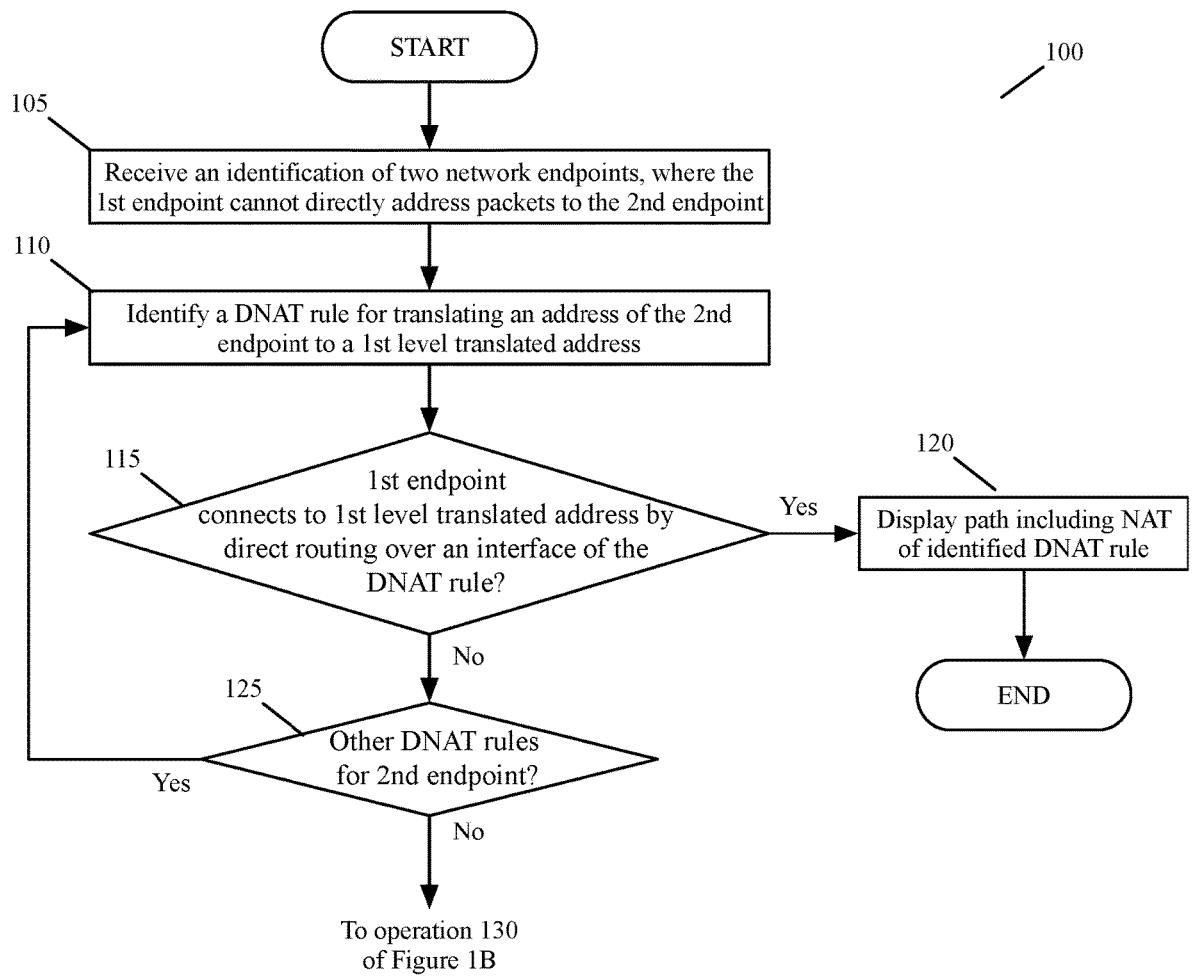
FIGS. 1A-1B conceptually illustrate a process for determining and displaying an indirect route through a network between a first network endpoint and a second network endpoint.

In the following detailed description of the invention, numerous details, examples, and embodiments of the invention are set forth and described. However, it will be clear and apparent to one skilled in the art that the invention is not limited to the embodiments set forth and that the invention may be practiced without some of the specific details and examples discussed.

Some embodiments provide a novel method of tracking connections in a network. The method receives an identification of a first network endpoint and a second network endpoint. The method then determines that the first network endpoint cannot directly address a packet flow to the second network endpoint. In other words, the method determines that there is no path (i.e., no route) between the end points through direct addressing. In some embodiments, the method makes this determination based on user input. In other embodiments the method performs an automated path search between the two endpoints to determine whether there is a path that can be found for data message flows from the first network endpoint to the second network endpoint, by using direct addressing that relies on the destination address specified by the first network endpoint that provides the data message flow. If not, the method determines that a packet that uses a destination network address specified by the first network endpoint, or a machine executing on or associated with the first network endpoint, cannot reach the desired second network endpoint without going through at least one address translation.

When the method determines that the first network endpoint cannot directly address a packet flow to the second network endpoint (e.g., determines that there is no path between the first and second network endpoints through direct addressing), the method identifies an address translation rule of a network device that translates an address of the second network endpoint into a translated address. The method then determines that the first network endpoint can directly address a packet flow to the translated address. The method then identifies a route from the first network endpoint to the second endpoint through the network device that translates the address and displays the route including an identifier of the network device.

In some embodiments, the network device is a load balancer or a network address translation (NAT) device. The network device of some embodiments uses the address translation rule, e.g., a destination NAT (DNAT), to change IP addresses of packets sent between the first and second endpoints.

In some embodiments, the network device is one of multiple network devices that each change IP addresses and/or port addresses of packets sent between the first and second endpoints and displaying the route also includes displaying an identifier of each of the multiple network devices.

Displaying the route, in some embodiments, includes displaying an interface option that, when selected, displays at least one address of a packet flow before the packet flow passes through the network device. The displayed addresses may include both an incoming address of a packet flow entering the network device and a translated address of the packet flow leaving the network device.

In some embodiments, the incoming address is an incoming destination address of the packet flow and the translated address is a translated destination address of the packet flow. In some embodiments, the incoming address is an incoming source address of the packet flow and the translated address is a translated source address of the packet flow.

In some embodiments that include an interface option, when the interface option is selected, the method also displays an incoming and outgoing interface identifier for the address translation rule. The display of the incoming address may include a display of both an IP address and a port address. Likewise, the display of the translated address may include a display of an IP address and a port address.

In some embodiments, the method receives a command to use an indirect route before identifying the route. In other embodiments, the method automatically determines that the route passes through the network device and that the address translation rule applies to packets using the route.

In some embodiments, before identifying an address translation rule that produces a translated address that the first endpoint can directly address, the method identifies a second address translation rule that produces a translated address that the first endpoint cannot directly address.

In some embodiments, no address translation rule that applies to the second network endpoint produces a translated address that is directly addressable by the first network endpoint. In such embodiments, the method finds at least one additional translation rule that applies to a translated address produced by the first address translation rule (possibly in addition to subsequent address translation rules) that eventually produce a translated address that the first network endpoint can directly address.

Figure 1B:
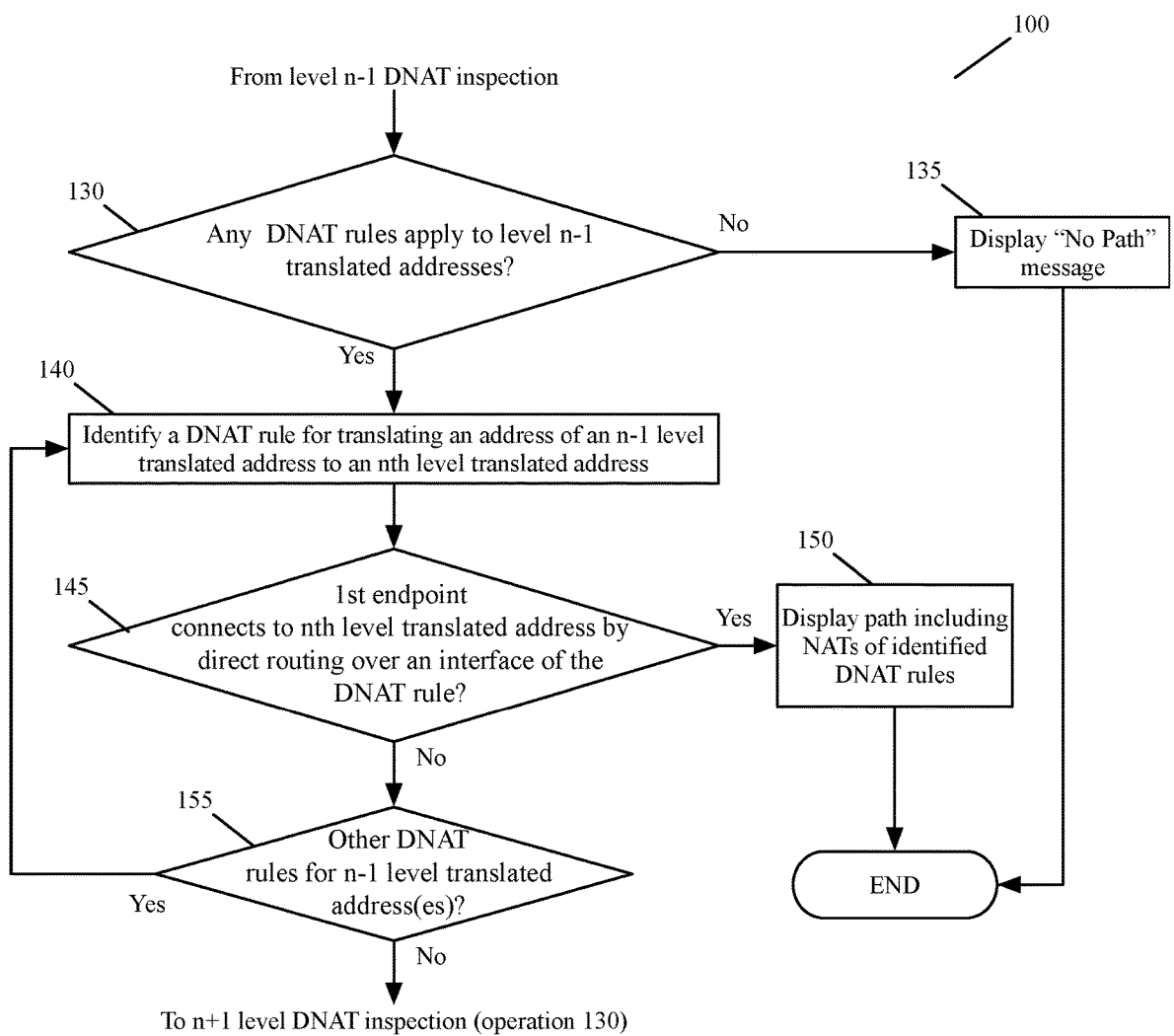

FIGS. 1A-1B conceptually illustrate a process 100 for determining and displaying an indirect route through a network between a first network endpoint and a second network endpoint. FIG. 1A conceptually illustrates a portion of process 100 that determines whether a single DNAT rule produces a translated address for a second network endpoint that can be directly addressed from a first network endpoint. FIG. 1B conceptually illustrates a portion of process 100 that, when a single DNAT rule cannot produce a translated address for a second network endpoint that can be directly addressed by a first network endpoint, is applied iteratively to determine additional DNAT rules to produce a translated address that can be directly addressed from a first network endpoint.

In FIG. 1A, the process 100 starts by receiving (at 105) identities of two network endpoints where the first network endpoint cannot directly address packets to the second network endpoint. These identities may be received from a user and may be received through the selection of VMs, host machines, devices of the network, or other entities with a network address that are associated with these identities. The first network endpoint cannot directly address packets to the second network endpoint when it does not have or cannot use the second network endpoints address for any number of reasons, such as providing additional security by hiding a group of IP addresses behind a single IP, re-using private IP space, and/or faster deployment of virtual Apps. In such cases, indirect addressing can be used to direct flows from the first network endpoint to the second network endpoint.

In some embodiments, the process 100 not only receives (at 105) identifiers for the two endpoints, but also determines (at 105) that there is no path through the network between the two endpoints through direct addressing. In some of these embodiments, the process 100 makes (at 105) this determination, because when the user provides the two endpoints, the user also specifies that there is no route between these two endpoints through direct addressing. In other embodiments, the process 100 performs (at 105) a path search between the two endpoints to determine whether there is a direct path between these two endpoints through direct addressing. To perform this automated path search, the process 100 performs a path emulation operation that examines the forwarding records of all the intervening switches and routers between these two endpoints to determine whether there is a set of forwarding records of the intervening routers/switches that connects the two endpoints. One example of such an approach is described in U.S. Pat. No. 10,237,142 which is incorporated herein by reference.

The process 100 then identifies (at 110) a DNAT rule for translating the address of the second endpoint to a first level translated address. The DNAT rule is for translating the destination address of packets to match the IP address of the second endpoint. The DNAT rule itself may be a rule in a match-action format that matches a tuple plus an interface of incoming packets at a NAT device, or load balancer device, of the network (e.g., a 5-tuple of an incoming packet flow that includes a source IP address, a source port address, a destination IP address, a destination port address, and protocol, where the packet flow arrives at the NAT through a particular interface), then performs an action, such as replacing the 5-tuple of packets of that incoming packet flow with a 5-tuple with source port and IP addresses corresponding to the NAT and destination IP and port addresses corresponding to the second endpoint, before sending the packets of the packet flow out on an interface used by the second network endpoint. Identifying a DNAT rule as a rule that applies to the second endpoint may be done by checking DNAT rules of the network whose action includes replacing a destination IP address of an incoming packet with the destination address of the second network endpoint. The destination IP address of the match portion of the DNAT rule corresponding to that action is identified as the first level translated address. That is, the first level translated address is the destination address of the second network endpoint, translated through a single DNAT rule.

Figure 2A:
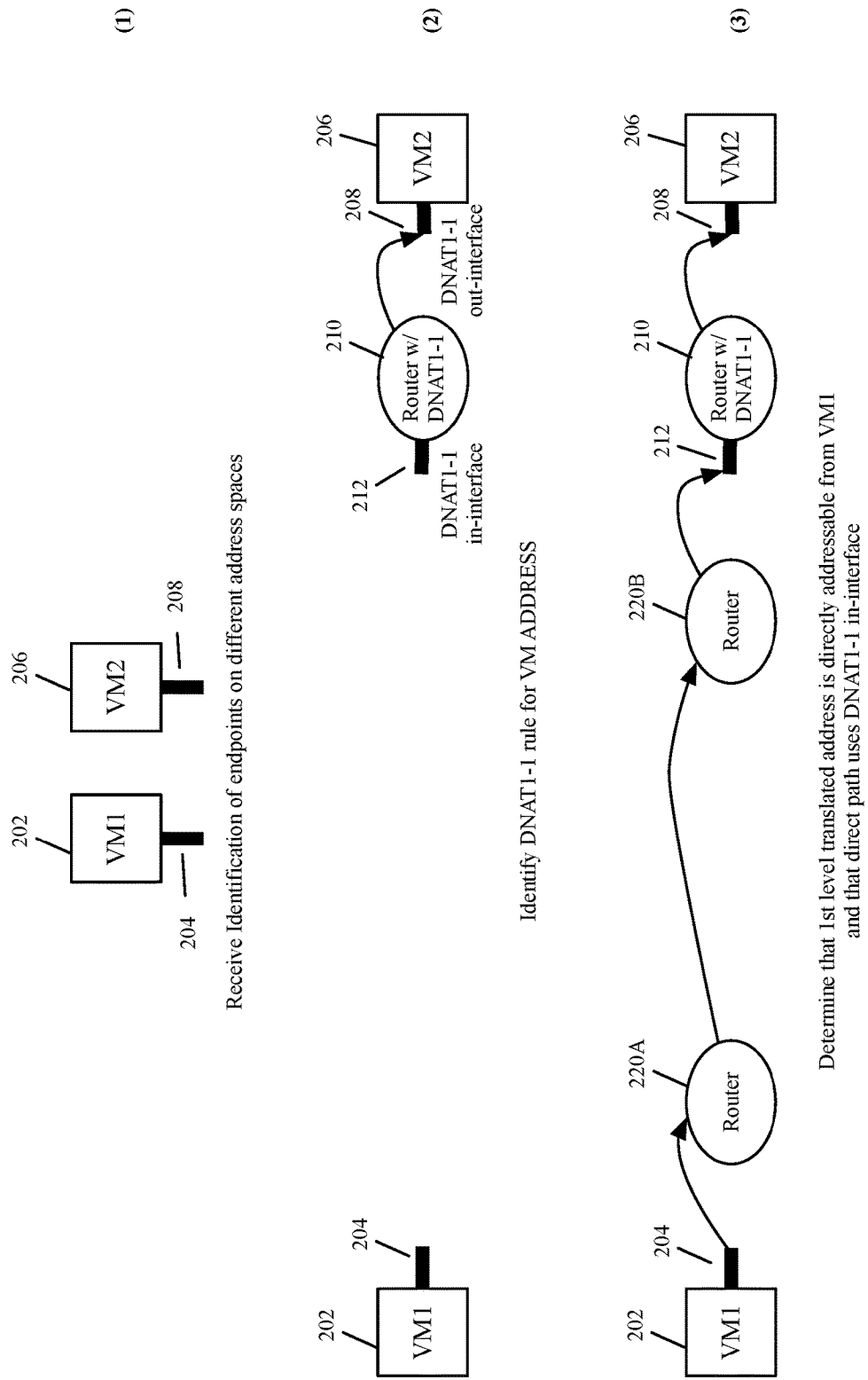
FIG. 2A illustrates identification of a route using the first tested DNAT rule.

The process 100 then determines (at 115) whether the first endpoint connects to the first level translated address (of the second endpoint) by direct routing over the interface in the match portion of that DNAT rule. If the first endpoint does connect to the first level translated address, over the matching interface, by direct routing, then a complete path between the endpoints has been identified (as shown in FIG. 2A, below). Accordingly, the process 100 displays (at 120) a path including the NAT at which the identified DNAT rule is applied.

In some embodiments, the method determines whether an endpoint can directly address another endpoint or a router with an address translation rule using data collected by a network managing and monitoring tool (e.g., VMware's vRealize Network Insight) sometimes called a network analyzer. For example, in some embodiments, such a tool might collect data including an inventory of devices, machines, and software on the network, including hosts, VMs, VLANs, and data from network virtualization software (e.g., VMware's NSX), all addresses, all virtual routing and forwarding data, all routing tables, all routing functions, all NAT rules, etc. A network with a network analyzer is further described in FIG. 6, below.

Figure 2B:
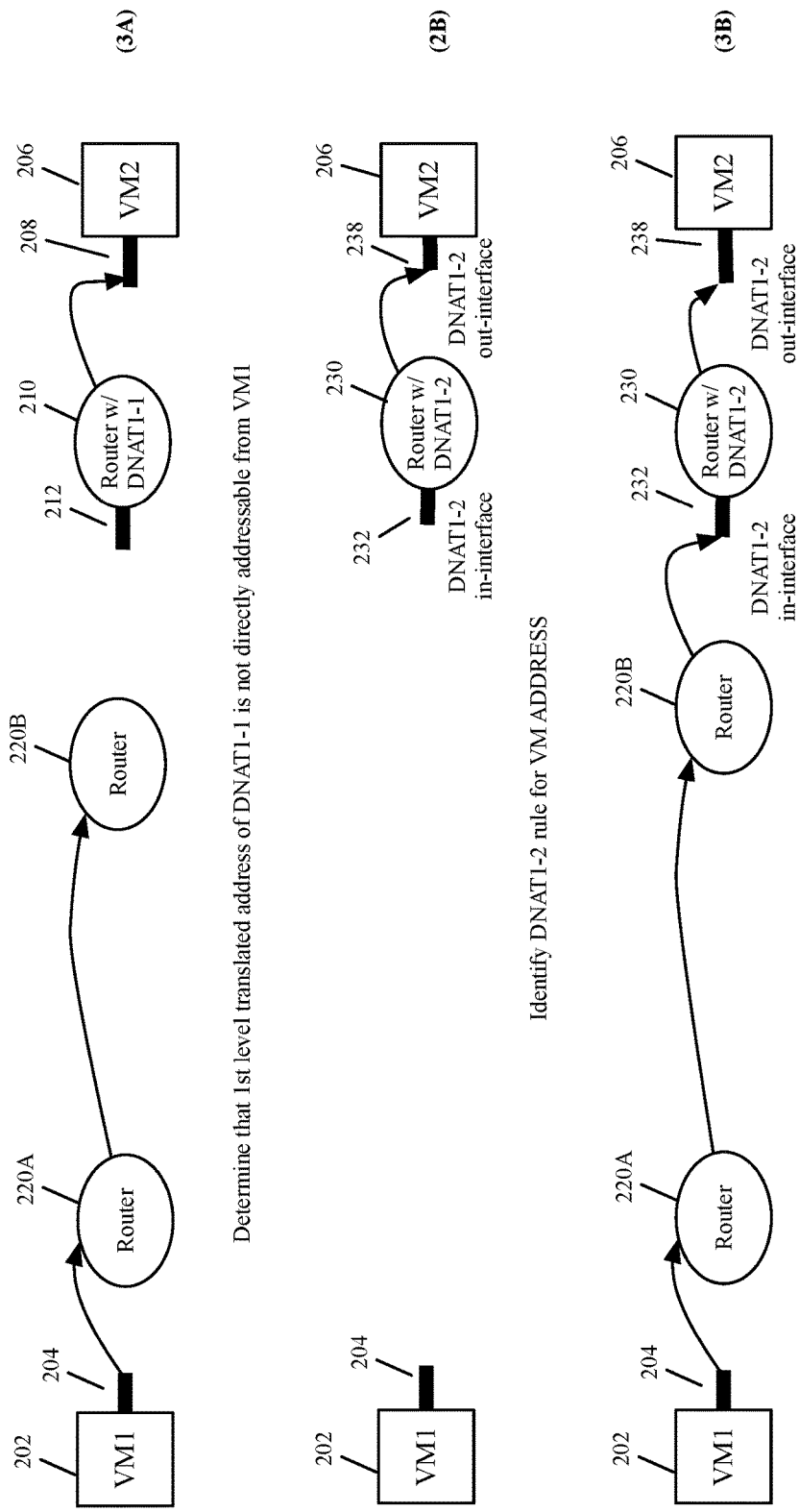
FIG. 2B illustrates an example of identification of a route using a second tested DNAT rule after the first tested DNAT rule fails to produce an indirect route.
Figure 2C:
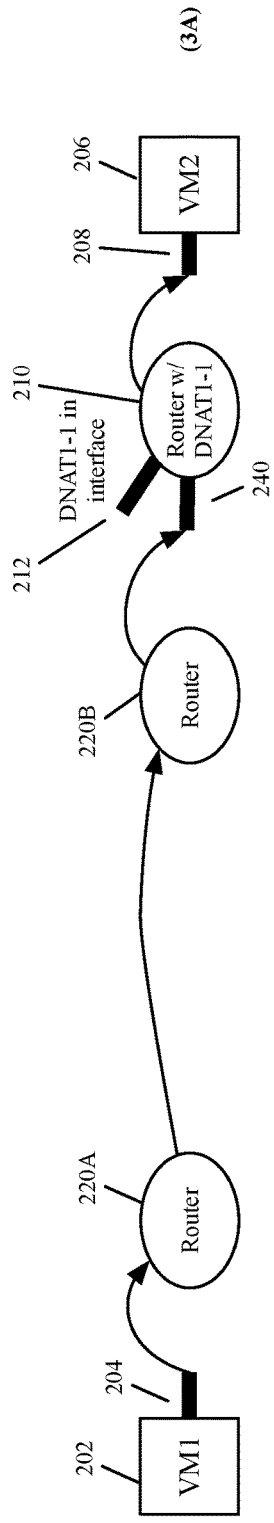
FIG. 2C illustrates a second example of identification of a route using a second tested DNAT rule after the first tested DNAT rule fails to produce an indirect route.
Figure 2C:
Figure 2C:
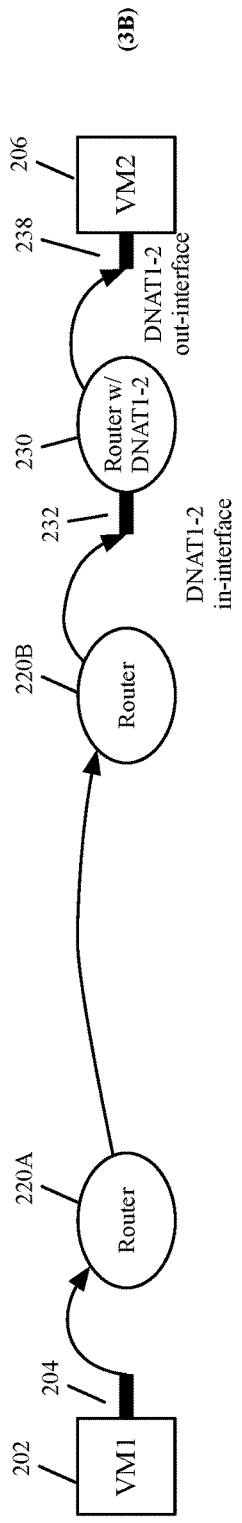

If (at 115) the first endpoint does not connect to the first level translated address, over the matching interface, by direct routing, then a complete path between the endpoints has not been identified. This can occur either because the first endpoint cannot directly address packets to the address of first level translated address (as shown in FIG. 2B, below), or because the direct addressing does not use the matching interface (as shown in FIG. 2C, below). Since the initially identified DNAT does not result in a complete path, the process 100 determines (at 125) whether other DNAT rules apply to the second network endpoint. If other DNAT rules apply, then the process 100 returns to operation 110 to identify another DNAT rule that applies to the second network endpoint.

If (at 125) no other DNAT rules apply, then the process 100 has exhausted all the applicable first level translated addresses. Accordingly, the process 100 proceeds to operation 130 of FIG. 1B. As mentioned above, the portion of process 100 shown in FIG. 1B may be applied iteratively. One of ordinary skill in the art will understand that the process 100 implements a breadth first search of a conceptual tree of DNAT rules, first seeking a complete path using a single DNAT rule (as shown in FIG. 1A), then 2 nested DNAT rules (with one iteration of the portion of process 100 in FIG. 1B), then 3 nested DNAT rules (with a second iteration of the portion of process 100 in FIG. 1B), and so on until a complete path is discovered or all chains of DNAT rules are exhausted.

Figure 3:
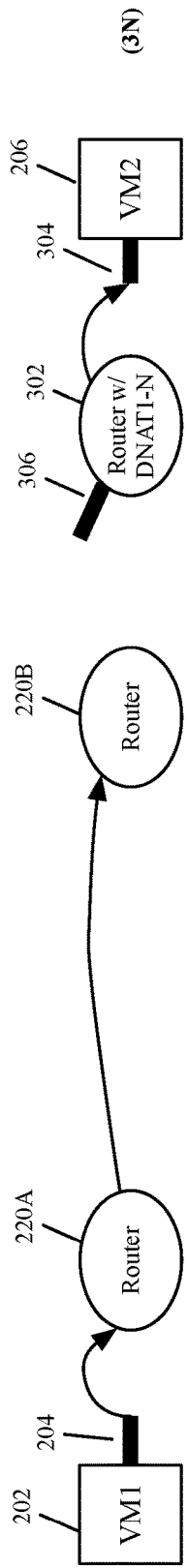
FIG. 3 illustrates an example of an indirect route with nested DNAT rules.
Figure 3:
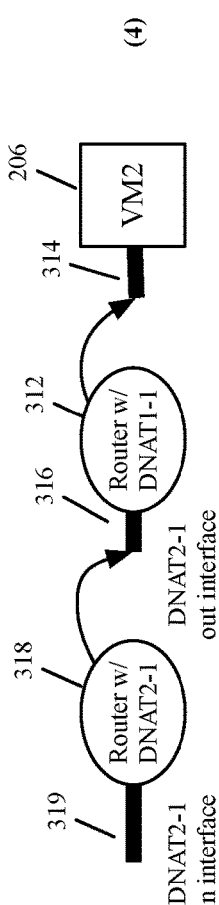
Figure 3:
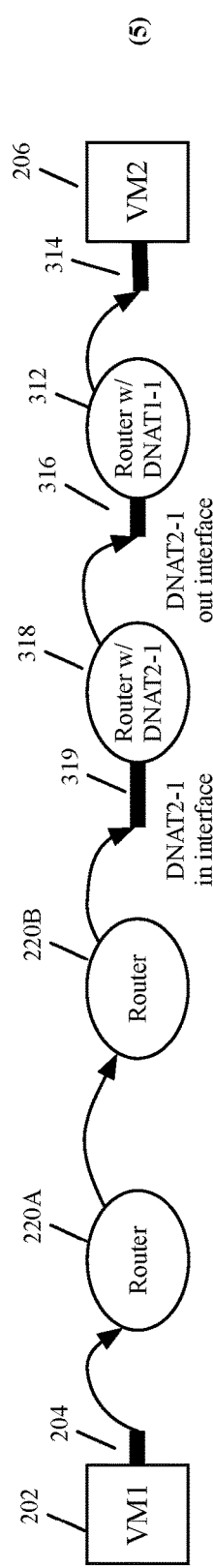

Each iteration starts after the preceding level of DNAT inspections have failed to produce a complete path between the first and second endpoints. That is, if no DNAT translates an address directly addressable from the first endpoint to the address of the second endpoint, then the next iteration inspects second level DNAT translated addresses. Paths with second level DNAT translated addresses include translation from the IP address of the second endpoint to an incoming address of a first NAT that applies a first level DNAT translation, the incoming address of the first NAT is translated in turn to an incoming address of a second NAT that applies a second level DNAT translation (as shown in FIG. 3, below) and so on.

In an iteration, the process 100 determines (at 130) whether any DNAT rules apply to level n−1 translated addresses, that is, whether there are any further DNAT rules that nest with the previous level of DNAT rules. Each iteration is applied only after the previous level of nested DNAT rules fails to produce a path between the endpoints. Therefore, if there are no further DNAT rules that nest with the previous level of nested DNAT rules, then the process 100 has determined that there is no path, direct or indirect between the endpoints. The process 100 then displays (at 135) a "no path" message.

If (at 130) there are DNAT rules that apply to the previous level of DNAT addresses, then the process 100 identifies (at 140) a DNAT rule for translating an address of an n−1 level translated address to an nth level translated address. That is, the process 100 identifies a new address provided by nesting another DNAT rule to a DNAT rule of the previous level.

The process 100 then determines (at 145) whether the first endpoint connects to the nth level translated address (of the second endpoint) by direct routing over the interface in the match portion of the last level DNAT rule. If the first endpoint does connect to the nth level translated address, over the matching interface, by direct routing, then a complete path between the endpoints has been identified.

Accordingly, the process 100 displays (at 150) a path including any NATs at which the identified, nested DNAT rules are applied.

If (at 145) the first endpoint does not connect to the nth level translated address, over the matching interface, by direct routing, then a complete path between the endpoints has not been identified. This can occur either because the first endpoint cannot directly address packets to the address of nth level translated address, or because the direct addressing does not use the matching interface. Since the identified DNAT does not result in a complete path, the process 100 determines (at 155) whether other DNAT rules apply to any of the previous level of DNAT translated addresses. If other DNAT rules apply, then the process 100 returns to operation 140 to identify another DNAT rule that applies to the previous level of DNAT translated addresses.

If (at 145) no other DNAT rules apply, then the process 100 has exhausted all the applicable nth level translated addresses. Accordingly, the process 100 proceeds to operation 130 of the next iteration of operations 130-155 of FIG. 1B.

FIG. 2A illustrates identification of a path using the first tested DNAT rule. FIG. 2A illustrates three phases of the method of some embodiments. Phase (1) represents the method receiving an identification of two endpoints on different address spaces of the network. The endpoints are VMs 202 and 206, which use interfaces 204 and 208, respectively, to connect to the network (not shown). Phase (2) represents the method identifying a first level 1 DNAT rule. The DNAT rule is designated DNAT1-1, with the leading 1 representing the level (number of nested DNAT rules) and the trailing 1 identifying this rule as the first DNAT rule of its level to be tested to determine whether an indirect path with this DNAT rule and no additional NAT rules can be found. DNAT1-1 is implemented by a router 210 on interface 212. In the illustrated case, when an incoming packet on interface 212 and with a 5-tuple matching the match attributes of DNAT1-1 is received by router 210, the destination address of the incoming packet is translated to the address of VM 206 and sent out on interface 208. In phase (3) the method identifies a path through a set of routers 220A and 220B that do not translate an address of the packets forwarded through the routers. This path allows the VM 202 to send packets through direct addressing to the translated address (of router 210) and interface 212 that matches the match attributes of DNAT1-1. The path then continues on through the router 210 (translated using DNAT1-1), through the interface 208, and to VM 206.

One of ordinary skill in the art will understand that the set of routers that do not translate the addresses may include any number of routers in some embodiments and may even include different routers in different instantiations of the route display operation, even in cases where the same DNAT rules are implemented.

While FIG. 2A illustrates an example in which the first tested DNAT rule allowed an indirect route between VMs 202 and 204, FIG. 2B illustrates an example of identification of a path using a second tested DNAT rule after the first tested DNAT rule fails to produce an indirect route. FIG. 2B is intended to illustrate differences that start at phase (3), attempting to identify a direct addressed path to the translated address of the first identified DNAT rule, therefore, phases (1) and (2A) (not shown) of this example would be identical to phases (1) and (2) of FIG. 2A. In phase (3A) of FIG. 2B, the translated address of the first tested DNAT rule (DNAT 1-1), implemented by router 210, is not directly addressable from VM 202. Accordingly, the method, in phase (2B), selects a new DNAT rule, DNAT1-2 implemented by router 230 and applying to packets received over interface 232. Then, in phase (3B) the method identifies a direct path through a set of routers 220A and 220B that do not translate an address of the packets forwarded through the routers.

In some cases, even though an endpoint can directly address the translated address provided by a DNAT rule, the endpoint might not reach that address on an interface that the DNAT rule applies to. FIG. 2C illustrates a second example of identification of a path using a second tested DNAT rule after the first tested DNAT rule fails to produce an indirect route. FIG. 2C is intended to illustrate differences (from FIG. 2A) that start at phase (3), attempting to identify a direct addressed path to the translated address of the first identified DNAT rule, therefore, phases (1) and (2A) (not shown) of this example would be identical to phases (1) and (2) of FIG. 2A. In phase (3A) of FIG. 2C, unlike in phase (3A) of FIG. 2B the translated address of the first tested DNAT rule (DNAT 1-1), implemented by router 210, is directly addressable from VM 202. However, the translated address is directly addressable over interface 240 and DNAT1-1 does not apply to packets received over interface 240 (i.e., the interface match attribute of DNAT1-1 is interface 212, not interface 240). Accordingly, the method, in phase (2B), selects a new DNAT rule, DNAT1-2 implemented by router 230 and applying to packets received over interface 232. Then, in phase (3B) the method identifies a direct path through a set of routers 220A and 220B that do not translate an address of the packets forwarded through the routers.

As mentioned above with respect to FIG. 1B, in some cases, multiple nested network address translation rules are necessary to provide a route between two endpoints. FIG. 3 illustrates an example of an indirect path with nested DNAT rules. FIG. 3 includes 3 phases. In phase (3N) the method determines that the translated address of the last level 1 DNAT rule, DNAT1-N, implemented by router 302 on packets arriving over interface 306 and leaving over interface 304 of VM 206 is not directly addressable from VM 202. As described with respect to FIG. 1B, when no single DNAT rule allows an indirect path between two endpoints, the method of some embodiments seeks an indirect path using nested DNAT rules. Therefore, in phase (4), the method identifies a first nested set of DNAT rules, using DNAT2-1 on router 318 and DNAT1-1 on router 312. DNAT1-1 was identified (e.g., when identifying level 1 DNAT rules) as applying to the address of VM 206, using interface 314. The address of VM 206 is translated to a first translated address by router 312 using DNAT1-1. DNAT2-1 is identified as applying to the first translated address (e.g., having the first translated address and interface 316 as the action attributes of DNAT2-1) The first translated address is translated to a second translated address by router 318, and DNAT2-1 applies to packets arriving at the second translated address over interface 319. In phase (5) the method determines that the second translated address is directly addressable (through interface 319) by VM 202, and therefore that there is an indirect path from VM 202, through interface 204, through a set of routers 220A and 220B, through interface 319, through router 318 (using DNAT2-1), through interface 316, through router 312 (using DNAT1-1), through interface 314, to VM 206.

Figure 4:
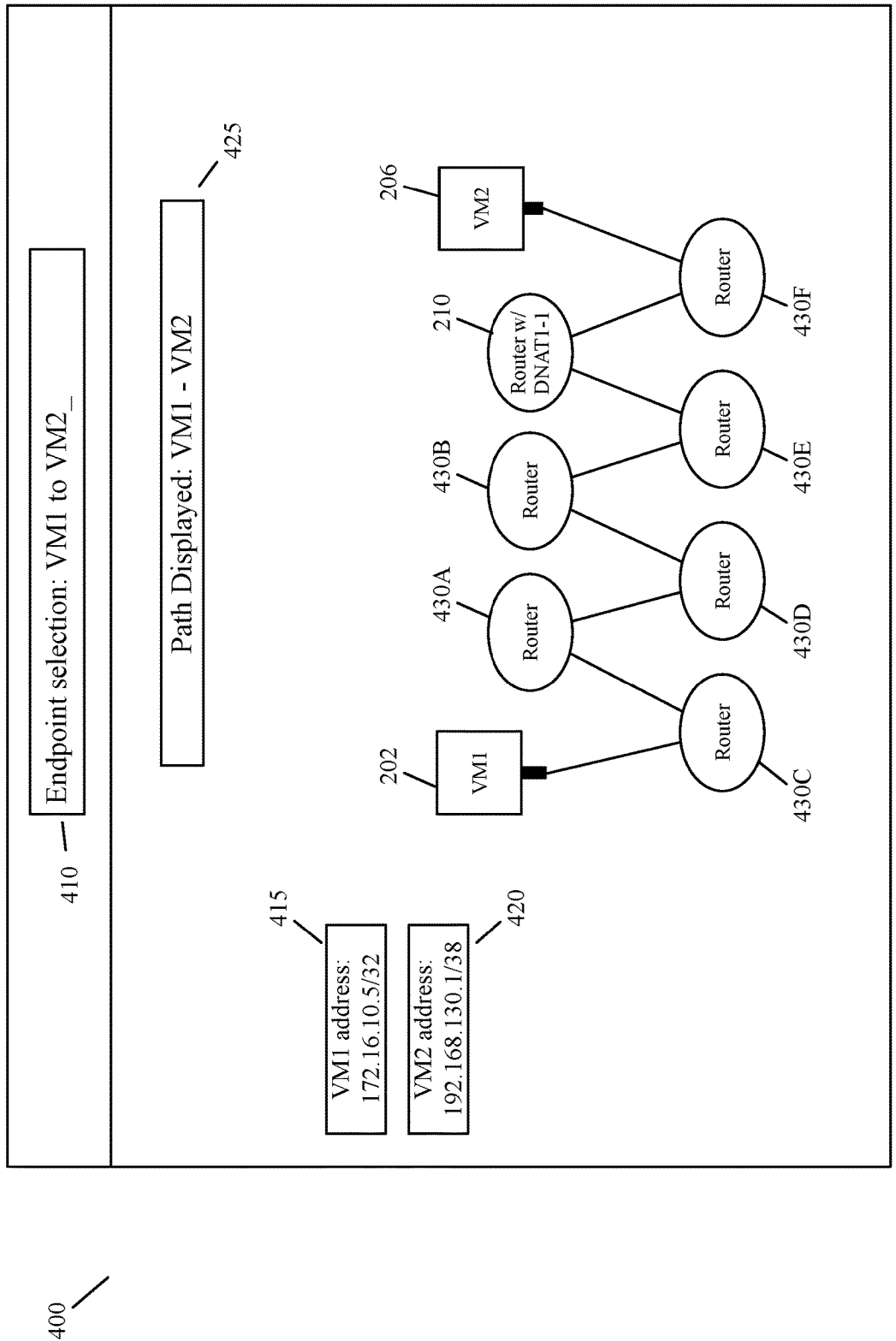
FIG. 4 illustrates an example of a graphical user interface (GUI) of some embodiments for identifying indirect paths.

FIG. 4 illustrates an example of a graphical user interface (GUI) 400 of some embodiments for identifying indirect paths. One of ordinary skill in the art will understand that the specific interface controls and display boxes in FIG. 4 are merely an example and that other embodiments could use other, fewer, or additional GUI items. The GUI 400 includes an endpoint selection control 410 that receives selections from a user of the GUI 400 of endpoints within the network. In this example, the user has selected VM1 and VM2. After a user has selected two endpoints, the GUI 400 then displays address information for the endpoints in address display boxes 415 and 420 and an identifier of the currently selected endpoints in path identification box 425.

In this example, the GUI 400 has identified a router 210 with a DNAT rule that translates a destination address that is directly addressable from VM 202 to the address of VM 206. The GUI additionally displays a set of routers 430A-430E that provides a path (using direct addressing) from VM 202 to router 210 and an additional router 430F that provides a path from router 210 to VM 206. Although routers 430A-430F are all routers in the illustrated example, one of ordinary skill in the art will understand that in some embodiments other devices that send packets may be used in addition to or instead of any or all of the routers. For example, in some embodiments, some or all of the packet forwarding devices could be logical routers, physical routers, logical switches, physical switches, load balancers, routers or other hardware or software devices configured to perform as edge virtual routing and forwarding (VRF), or any other hardware or software device for directing packets in a network.

Figure 5:
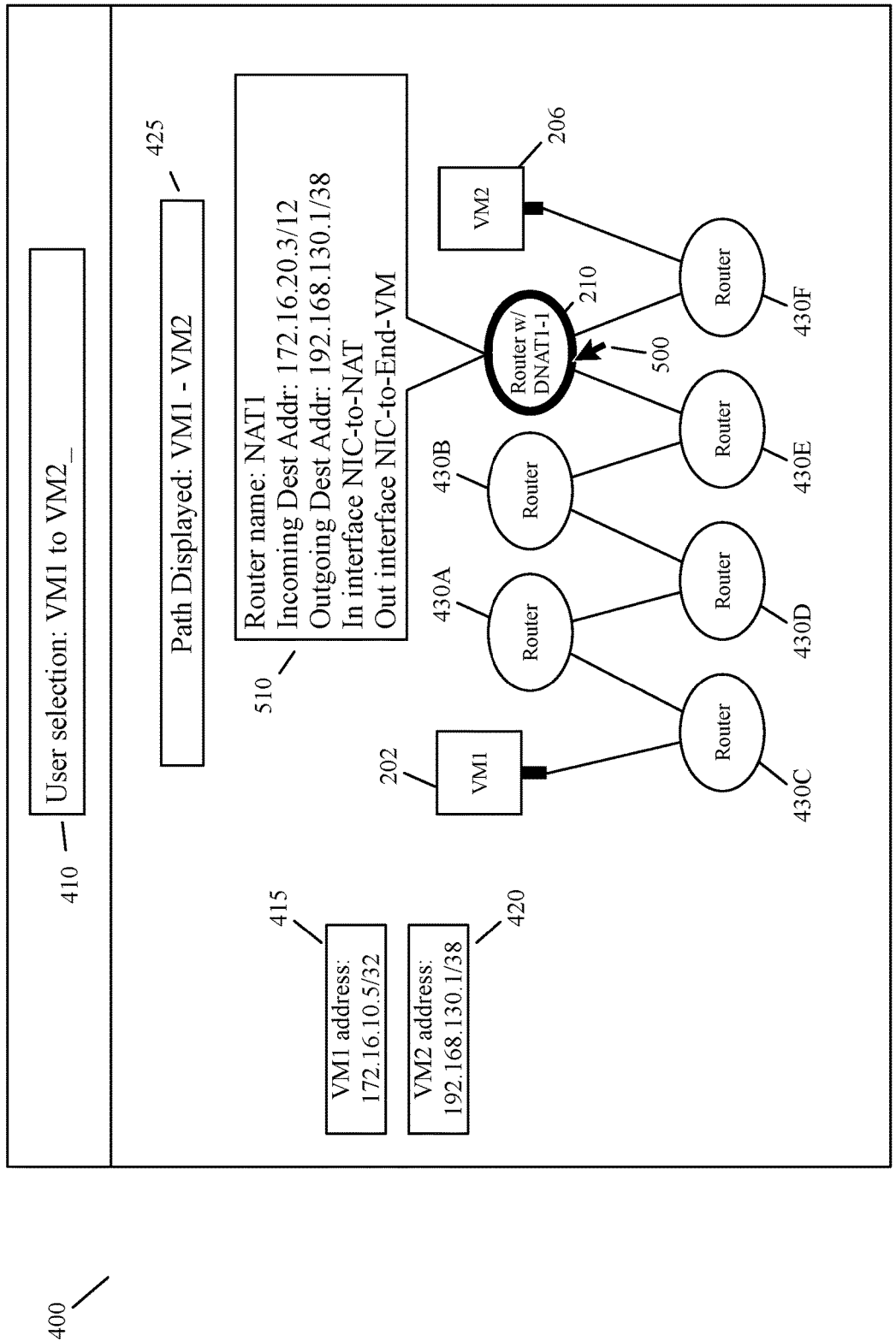
FIG. 5 illustrates a user interface tool that displays information about a router with a DNAT rule that provides part of the identified route.

FIG. 5 illustrates a user interface tool that displays information about a router with a DNAT rule that provides part of the identified route. FIG. 5 shows the GUI 400, with the display object of router 210 selected by a cursor 500 (e.g., by a clicking operation, hovering operation, or some other cursor interaction with the display object of router 210. As a result of the selection, the GUI 400 creates a display box 510 that includes a name (or other identification information) of the router 210, the destination address of incoming packets, the destination address of outgoing packets, the in interface of the packets to which the DNAT rule, DNAT1-1, applies, and the out interface of the packets to which the DNAT rule, DNAT1-1, applies.

Although the above description refers to match attributes and action attributes of DNAT rules as including 5-tuples, in other embodiments, other tuples are used, e.g., 4-tuples that do not include the packet protocol. Although the match attributes in some embodiments and some cases include the interface that the packets are received on, in some embodiments the interface match attribute may be set to multiple interfaces, or set to any interface (i.e., the DNAT rule will apply to packets arriving at the matching address over any interface). In some embodiments, rather than a NAT, the indirect addressing rules will be applied by a load balancer.

The above described embodiments applied one or more DNAT rules to identify indirect paths through a network. However, one of ordinary skill in the art will understand that other embodiments may use other address translation rules in addition to or instead of DNAT rules. For example, some embodiments may use source NAT rules (SNAT) instead of or in addition to DNAT rules. Similarly, some embodiments may use conversion rules from virtual IP (VIP) addresses to dynamic IP (DIP) addresses (e.g., in load balancers) in addition to or instead of SNAT and/or DNAT rules.

The above described embodiments automatically determine which DNAT rule to use in determining an indirect route. However, in other embodiments, a user may be prompted to select a DNAT rule to use for the route. In other embodiments, the user may narrow the selection of address translation rules but not directly determine the address translation rules (e.g., by limiting the types or number of address translation rules can be applied to an indirect path, etc.)

Figure 6:
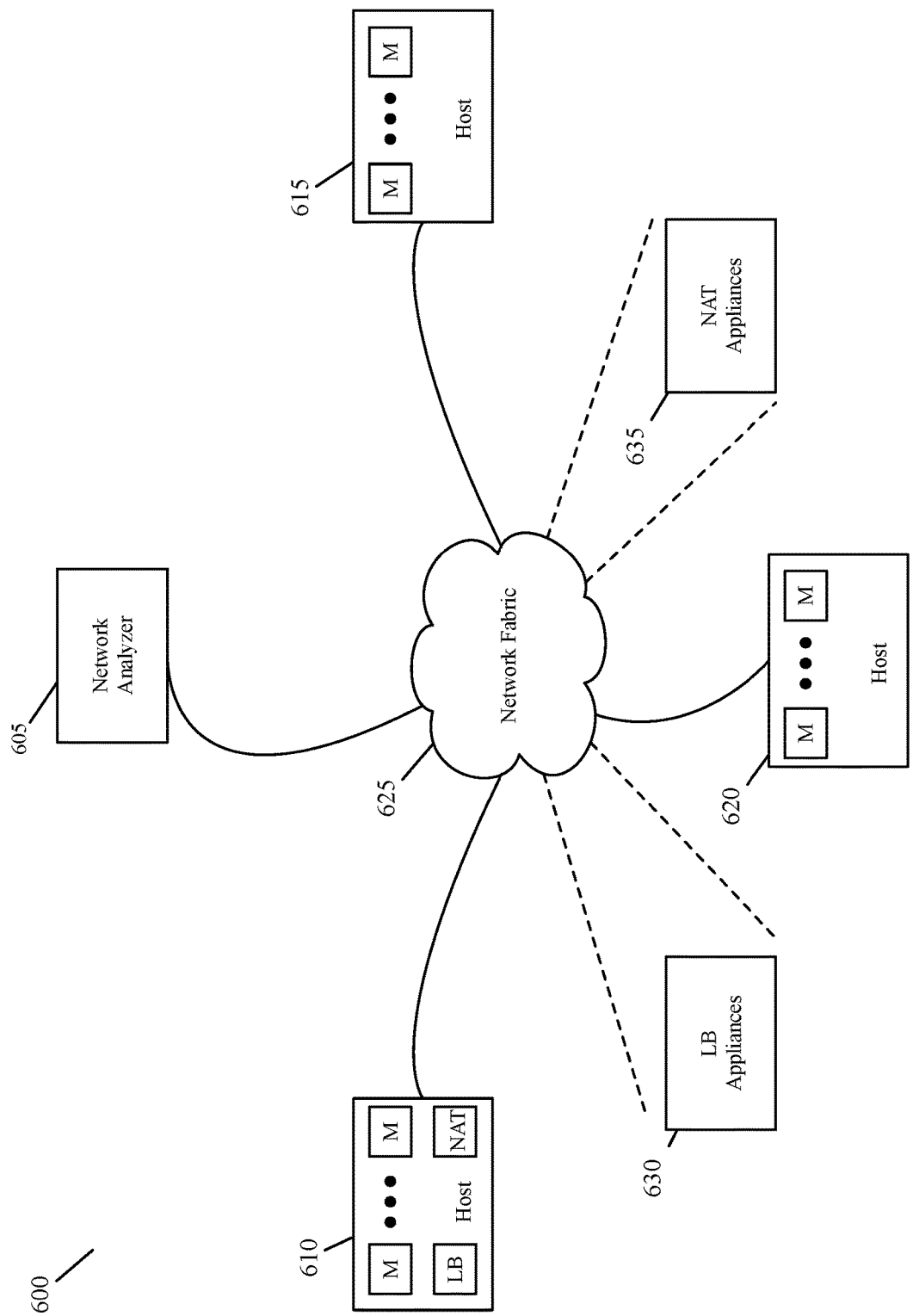
FIG. 6 conceptually illustrates a network system of some embodiments with a network analyzer.

In some embodiments, the data used to identify routing through the network (including through routers implementing NAT rules) are collected by a network analyzer. FIG. 6 conceptually illustrates a network system 600 of some embodiments with a network analyzer 605. The network system 600 could be implemented at a single datacenter or could include multiple locations (e.g., connected through an intervening network). The network system 600 includes multiple hosts 610-620. The hosts 610-620 are hosts for various machines (e.g., virtual machines, containers, etc.). The various machines on the hosts 610-620 communicate through a network fabric 625, which may include one or more load balancing (LB) appliances 630 and/or NAT appliances 635. These LB appliances 630 and NAT appliances 635 may be implemented as hardware, software, or software modules implemented on devices of the network fabric 625, such as software routers or hardware routers. In addition to or instead of LB appliances 630 and NAT appliances 635 in the network fabric, some embodiments may have LB appliances and NAT appliances implemented by the hosts, such as host 610.

The network analyzer 605 is a network managing and monitoring tool (e.g., VMware's vRealize Network Insight) that receives data from various hardware and software on the hosts 610-620 and the network fabric 625. For example, in some embodiments, the network analyzer 605 collects data including an inventory of devices, machines, and software on the network system, including hosts, VMs, VLANs, containers, and data from network virtualization software (e.g., VMware's NSX), all addresses, all virtual routing and forwarding data, all routing tables, all routing functions, all NAT rules, etc. This data may be analyzed and displayed in the user interfaces illustrated in FIGS. 4 and 5.

Figure 7:
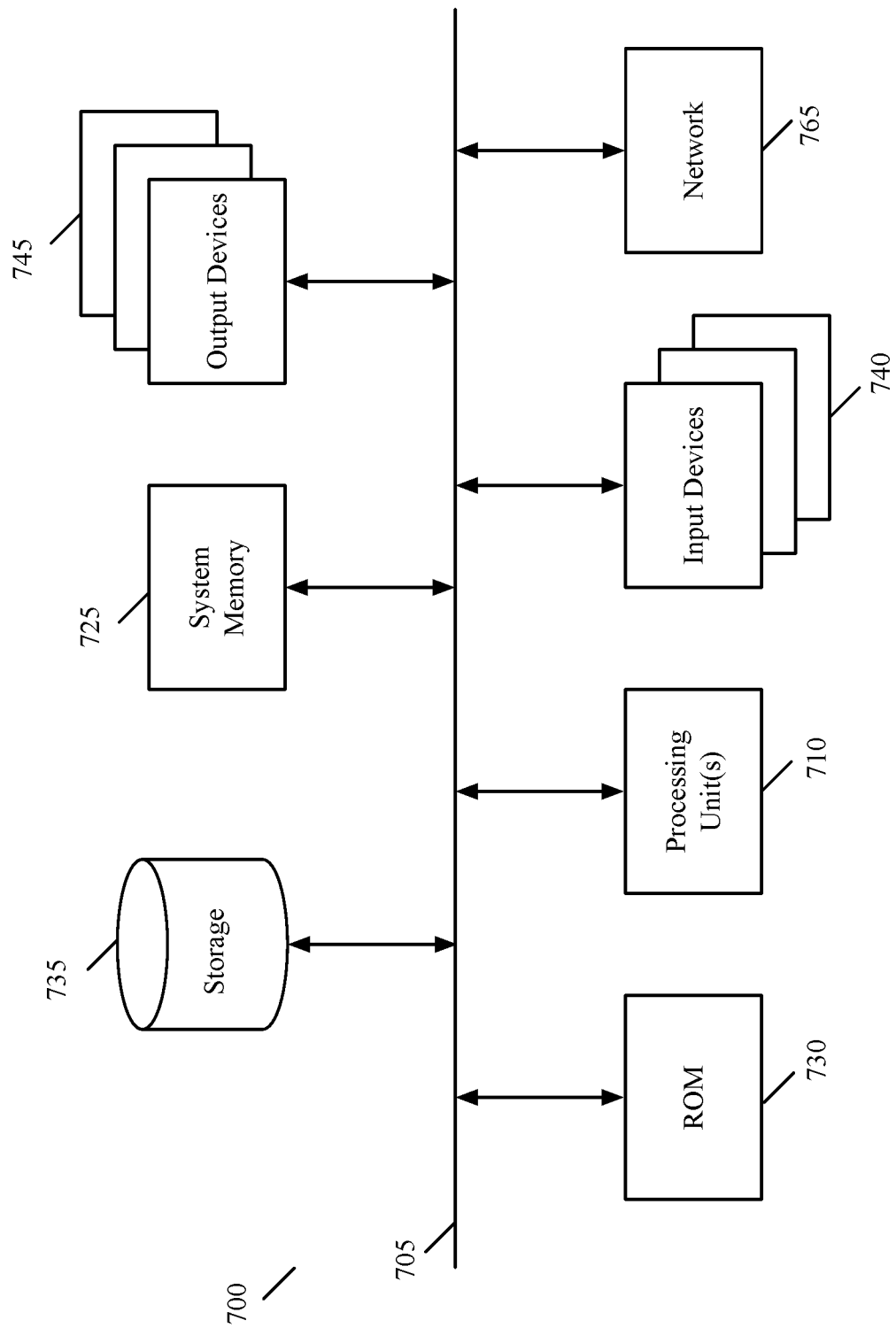
FIG. 7 conceptually illustrates an electronic system with which some embodiments of the invention are implemented.

FIG. 7 conceptually illustrates an electronic system 700 with which some embodiments of the invention are implemented. The electronic system 700 can be used to execute any of the control, virtualization, or operating system applications described above. The electronic system 700 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 700 includes a bus 705, processing unit(s) 710, a system memory 725, a read-only memory 730, a permanent storage device 735, input devices 740, and output devices 745.

The bus 705 collectively represents all system, peripheral, and chipset buses that communicatively connect the numerous internal devices of the electronic system 700. For instance, the bus 705 communicatively connects the processing unit(s) 710 with the read-only memory 730, the system memory 725, and the permanent storage device 735.

From these various memory units, the processing unit(s) 710 retrieve instructions to execute and data to process in order to execute the processes of the invention. The processing unit(s) may be a single processor or a multi-core processor in different embodiments.

The read-only-memory (ROM) 730 stores static data and instructions that are needed by the processing unit(s) 710 and other modules of the electronic system. The permanent storage device 735, on the other hand, is a read-and-write memory device. This device is a non-volatile memory unit that stores instructions and data even when the electronic system 700 is off. Some embodiments of the invention use a mass-storage device (such as a magnetic or optical disk and its corresponding disk drive) as the permanent storage device 735.

Other embodiments use a removable storage device (such as a floppy disk, flash drive, etc.) as the permanent storage device. Like the permanent storage device 735, the system memory 725 is a read-and-write memory device. However, unlike storage device 735, the system memory is a volatile read-and-write memory, such a random access memory. The system memory 725 stores some of the instructions and data that the processor needs at runtime. In some embodiments, the invention's processes are stored in the system memory 725, the permanent storage device 735, and/or the read-only memory 730. From these various memory units, the processing unit(s) 710 retrieve instructions to execute and data to process in order to execute the processes of some embodiments.

The bus 705 also connects to the input and output devices 740 and 745. The input devices 740 enable the user to communicate information and select commands to the electronic system. The input devices 740 include alphanumeric keyboards and pointing devices (also called "cursor control devices"). The output devices 745 display images generated by the electronic system 700. The output devices 745 include printers and display devices, such as cathode ray tubes (CRT) or liquid crystal displays (LCD). Some embodiments include devices such as a touchscreen that function as both input and output devices.

Finally, as shown in FIG. 7, bus 705 also couples electronic system 700 to a network 765 through a network adapter (not shown). In this manner, the computer can be a part of a network of computers (such as a local area network ("LAN"), a wide area network ("WAN"), or an Intranet, or a network of networks, such as the Internet. Any or all components of electronic system 700 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application-specific integrated circuits (ASICs) or field-programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, are non-VM DCNs that include a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

While the invention has been described with reference to numerous specific details, one of ordinary skill in the art will recognize that the invention can be embodied in other specific forms without departing from the spirit of the invention. In addition, a number of the figures conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method of identifying a route in a network between a first network endpoint and a second network endpoint, the method comprising:
   determining that the first network endpoint cannot directly address a packet flow to the second network endpoint;
   based on the determination that the first network endpoint cannot directly address the packet flow to the second network endpoint, identifying an address translation rule of a network device that translates an address of the second network endpoint into a translated address;
   determining that the first network endpoint can directly address a packet flow to the translated address;
   identifying a route from the first network endpoint to the second endpoint through the network device that translates the address; and
   displaying the route including an identifier of the network device.

2. The method of claim 1, wherein the network device is a network address translation (NAT) device.

3. The method of claim 1, wherein the network device comprises a load balancer.

4. The method of claim 1, wherein the network device uses the address translation rule to change IP addresses of packets sent between the first and second endpoints.

5. The method of claim 1, wherein the network device is one of a plurality of network devices that each change IP addresses of packets sent between the first and second endpoints, wherein displaying the route further includes displaying an identifier of each of the plurality of network devices.

6. The method of claim 1, wherein the network device uses the address translation rule to change port addresses of packets sent between the first and second endpoints.

7. The method of claim 1, wherein displaying the route comprises displaying an interface option that when selected displays at least one address of a packet flow before the packet flow passes through the network device.

8. The method of claim 7, wherein the interface option, when selected, displays an incoming address of a packet flow entering the network device and a translated address of the packet flow leaving the network device.

9. The method of claim 8, wherein the incoming address is an incoming source address of the packet flow and the translated address is a translated source address of the packet flow.

10. The method of claim 8, wherein the incoming address is an incoming destination address of the packet flow and the translated address is a translated destination address of the packet flow.

11. The method of claim 8, wherein the interface option, when selected, further displays an incoming and outgoing interface identifier for the address translation rule.

12. The method of claim 8, wherein the display of the incoming address comprises a display of an IP address and a port address.

13. The method of claim 8, wherein the display of the translated address comprises a display of an IP address and a port address.

14. The method of claim 1 further comprising, before identifying the route, receiving a command to use an indirect route.

15. The method of claim 1 further comprising automatically determining that the route passes through the network device and that the address translation rule applies to packets using the route.

16. The method of claim 1, wherein the address translation rule is a first address translation rule and the translated address is a first translated address, the method further comprising, before identifying the first address translation rule:
   identifying a second translation rule that a network device uses to translate an address of the second network endpoint into a second translated address; and
   determining that the first network endpoint cannot directly address a packet flow to the second translated address.

17. A method of identifying a route in a network between a first network endpoint and a second network endpoint that the first network endpoint cannot directly address, the method comprising:
   determining whether a first translation rule exists that translates an address of the second network endpoint to a first translated address to which the first network endpoint can directly address packets, the first translated address associated with a first network device;
   based on a determination that the first network endpoint cannot directly address the packets to the first translated address, identifying a second translation rule that a second network device, preceding the first network device, uses to translate the first translated address to a second translated address to which the first network endpoint can directly address packets;
   identifying a route from the first network endpoint to the second network endpoint through the first and second network devices; and
   displaying the route including first and second identifiers for the first and second network devices.

18. The method of claim 17, wherein each of the first and second network devices comprise a network address translation (NAT) device or a load balancer.

19. The method of claim 17, wherein the first and second network devices use the first and second translation rules to change IP addresses of packets sent between the first and second endpoints.

20. The method of claim 17, wherein the first and second network devices use the first and second translation rules to change port addresses of packets sent between the first and second endpoints.

* * * * *